US008970633B2

(12) United States Patent
Fong (10) Patent No.: US 8,970,633 B2
(45) Date of Patent: Mar. 3, 2015

(54) TOUCH WHEEL ZOOM AND PAN (75) Inventor: Chee Keat Fong, Cypress, TX (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 12/808,995

(22) PCT Filed: Dec. 26, 2007

(86) PCT No.: PCT/US2007/026319
§ 371 (c)(1),
(2), (4) Date: Jun. 17, 2010

(87) PCT Pub. No.: WO2009/082377
PCT Pub. Date: Jul. 2, 2009

(65) Prior Publication Data
US 2010/0271401 A1 Oct. 28, 2010

(51) Int. Cl.
*G09G 5/00* (2006.01)
*G06F 3/0485* (2013.01)
*G06F 3/0488* (2013.01)
(52) U.S. Cl.
CPC .......... *G06F 3/0485* (2013.01); *G06F 3/04883* (2013.01); *G06F 2203/04806* (2013.01)
USPC ........... 345/661; 345/659; 345/660; 345/667; 345/684; 345/619; 345/169; 345/173; 345/174
(58) Field of Classification Search
CPC ..................... G06F 3/0485; G06F 2203/04806
USPC ......... 345/659, 660–667, 694, 810, 856, 619, 345/173–174, 169
See application file for complete search history.

(56) References Cited

U.S. PATENT DOCUMENTS

| | | | |
|---|---|---|---|
| 2004/0135824 A1* | 7/2004 | Fitzmaurice | 345/856 |
| 2004/0141010 A1* | 7/2004 | Fitzmaurice et al. | 345/810 |
| 2005/0168488 A1* | 8/2005 | Montague | 345/659 |
| 2006/0026536 A1* | 2/2006 | Hotelling et al. | 715/863 |
| 2006/0109566 A1* | 5/2006 | Kim | 359/694 |
| 2006/0129951 A1* | 6/2006 | Vaananen et al. | 715/864 |
| 2006/0187216 A1 | 8/2006 | Trent et al. | |
| 2006/0232611 A1* | 10/2006 | Brooke | 345/671 |
| 2007/0040810 A1* | 2/2007 | Dowe et al. | 345/173 |
| 2007/0165004 A1 | 7/2007 | Seelhammer et al. | |
| 2008/0129759 A1* | 6/2008 | Jeon et al. | 345/667 |
| 2009/0002391 A1* | 1/2009 | Williamson et al. | 345/619 |
| 2009/0046110 A1* | 2/2009 | Sadler et al. | 345/660 |
| 2009/0109243 A1* | 4/2009 | Kraft et al. | 345/660 |
| 2011/0128234 A1* | 6/2011 | Lipman et al. | 345/173 |

OTHER PUBLICATIONS

Gabor Blasko, Franz Coriand, Steven Feiner, "Exploring interaction With a Simulated Wrist-Worn Projection Display", pp. 2-9, Oct. 18-21, 2005.
International Searching Authority, International Search Report and the Written Opinion, 11 pages, Sep. 2008.

* cited by examiner

*Primary Examiner* — Jin-Cheng Wang
(74) *Attorney, Agent, or Firm* — Mahamedi Paradice LLP (57) ABSTRACT

Systems, methods, and other embodiments associated with controlling zooming and panning on a handheld computing device (e.g., personal digital assistant (PDA)) are described. A PDA may include a touch sensor that can generate both rotational and flick signals. A PDA may display images at different zoom levels. When "zoomed in", less than an entire image may be displayed. Therefore a PDA may pan to different viewable image portions. An example system includes a receive logic to receive a rotational signal from the touch sensor. The rotational signal has a direction that indicates a desired zoom level change. The example system includes a control logic to change the zoom level in response to the rotational signal and to control the PDA to display the image in accordance with the updated zoom level.

19 Claims, 8 Drawing Sheets

TOUCH WHEEL ZOOM AND PAN

BACKGROUND

Handheld computing devices are ubiquitous. Common handheld computing devices include, a personal digital assistant (PDA), a cellular telephone, a music player (e.g., MP3 player), a movie player (e.g., MPEG player), a personal game system, and so on. These handheld computing devices may run a variety of applications including image viewing programs, word processors, video games, telephony, email, and so on. These handheld computing devices may include a variety of well known input controls suited to their applications. For example, handheld computing devices may include keypads, touch sensors, buttons, wheels, sliders, and so on. Furthermore, these input devices may be both physical (e.g., keypad with fixed, physical buttons) or virtual (e.g., keypad displayed on touch sensitive display). Thus, numerous combinations of input devices and applications are available. However, interesting combinations of input devices and applications continue to arise.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A handheld computing device may display images (e.g., digital photographs). Conventionally a user may have been able to zoom in or zoom out on a displayed image using a dedicated zoom button. The dedicated zoom button may have been physical (e.g., thumb wheel, arrow button) or virtual (e.g., arrow displayed on touch sensitive display). A handheld computing device may include a conventional touch wheel. The touch wheel may have been used to navigate through a menu, to control a scroll bar, and so on. Example systems and methods described herein accept input from a touch wheel to control the zoom level of a displayed image. Example systems and methods described herein may also accept input from an inner portion of a touch wheel to control panning actions on a displayed image. In one example, if a displayed image is "zoomed out" all the way, then a pan instruction may be interpreted as a scroll instruction and a different digital image may be displayed.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1:
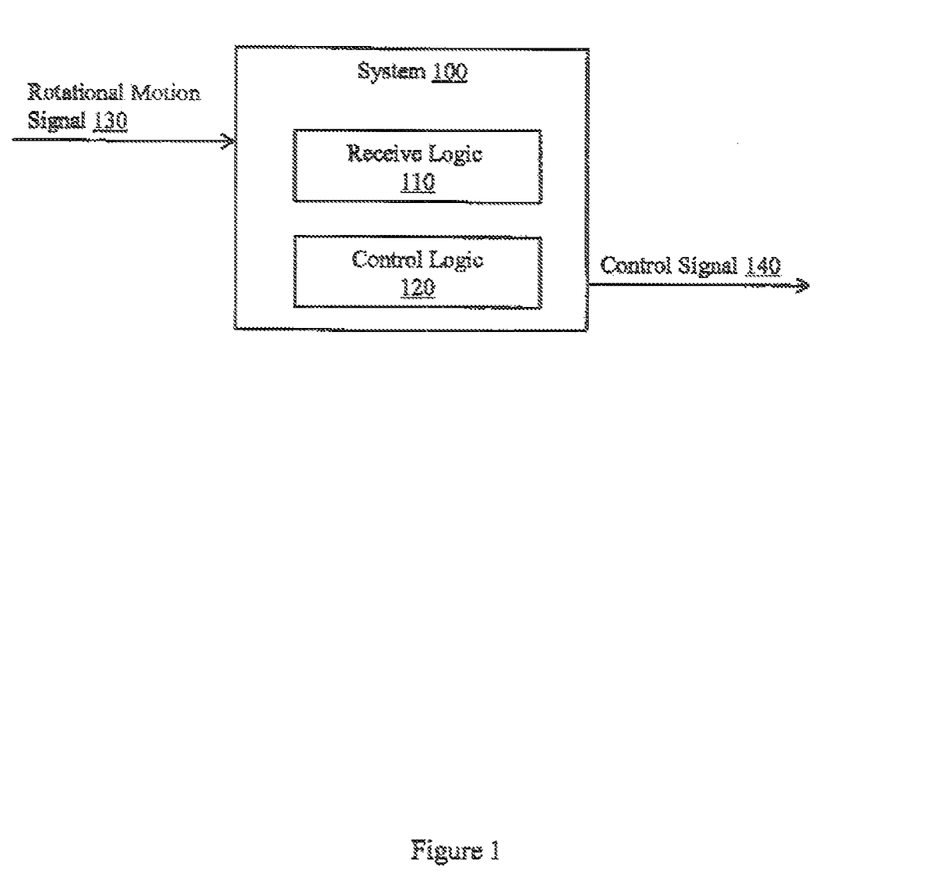
FIG. 1 illustrates an example system associated with zooming using a touch wheel control on a handheld computing device.

FIG. 1 illustrates an example system 100 associated with zooming (e.g., zoom in, zoom out) an image using a touch wheel control on a handheld computing device. The handheld computing device may be, for example, a personal digital assistant (PDA), a cellular telephone, a personal game system, a dedicated image viewer, and so on. The handheld computing device can display an image and can be configured to allow a user to zoom in or zoom out using input received from the touch wheel control. The touch wheel control may be described, more generally, as a touch sensor. As used herein, "touch sensor" refers to a type of control commonly found on handheld computing devices like MP3 players, laptop computers, and so on. Example "touch sensors" are described in United States Patent Application Publications 2004/0252109, 2007/0273671. A touch wheel and a touch sensor are capable of providing a signal in response to a rotational motion on the touch device. For example, rotating a finger around the outside of a touch wheel can generate a signal indicating the direction of rotation and, in some cases, the speed in which the finger was rotated.

System 100 includes a receive logic 110. Receive logic 110 will receive a rotational motion signal 130. The rotational motion signal 130 may be received from a touch sensor associated with the handheld computing device. The touch sensor may be, for example, a resistive touch sensor, a capacitive touch sensor, an inductive touch sensor, a surface acoustic wave sensing touch sensor, a pressure sensing touch sensor, an optical sensing touch sensor, and an electro-mechanical touch sensor. While seven types of touch sensors are described, it is to be appreciated that a rotational motion signal may be received from different types of touch sensors having different configurations. In different examples, the touch sensor may be overlaid on a keypad associated with the handheld computing device, may be integrated into a keypad associated with the handheld computing device, and so on.

As described in the published patent applications cited herein, the touch sensor may be formed as a closed loop having a physical constraint formed on an upper surface of the touch sensor. The constraint may be co-extensive with the outer perimeter of the closed loop. In one example, the rotational motion signal is generated in response to an interaction with the closed loop. In other examples the rotational motion signal may be generated in response to other interactions with the touch sensor. Conventionally, the rotational motion signal has been used to perform tasks like controlling a scroll bar, scrolling between files, traversing a menu, controlling an MP3 player volume, and so on. However, the rotational motion signal has not conventionally been used to control the zoom level of an image displayed, for example, on a PDA.

The rotational motion signal 130 has a rotational direction that can be interpreted to indicate a desired change in the zoom level. For example, a clockwise rotational motion may indicate a desire to zoom in while a counter-clockwise rotational motion may indicate a desire to zoom out. Different users may have different preferences concerning which rotational direction is to be interpreted to zoom in and/or zoom out and thus, in one example, updating a zoom level in response to the rotational motion may be configurable.

System 100 includes a control logic 120 to selectively change the zoom level in response to the rotational motion signal. Changing the zoom level may include, for example, updating a value stored in a memory, changing a value in a register, updating a value in a data store, providing a signal to a zoom level logic, and so on. Having changed the zoom level associated with the displayed image, control logic 120 may provide a control signal 140 to control the handheld computing device to display the image in accordance with the zoom level. In different examples the control signal 140 may provide the zoom level to the handheld computing device, may provide a pointer to the zoom level, may generate an interrupt in a screen refresh logic, and so on.

In one example, the rotational motion signal 130 has an angular velocity associated with how quickly the rotational motion occurred. While "angular velocity" is described, more generally the rotational motion signal 130 may include a component that describes the rate at which a user produced a rotational motion on a touch sensor. Receive logic 110 and/or control logic 120 may interpret this angular velocity as a desired rate of change for the zoom level. Thus, the control logic 120 may change the zoom level at a first rate associated with a first angular velocity and at a second rate associated with a second angular velocity. Thus, a user may zoom in more slowly or more quickly depending on how quick a rotational motion they make on the touch sensor. Once again different users may have different preferences for zoom speed and thus, in one example, this may be a configurable parameter.

Thus, system 100 includes a logic 110 to receive a rotational motion signal 130 from a touch sensor. System 100 also includes a control logic 120 to selectively update a zoom level based on the rotational motion signal 130. The control logic 120 also controls a handheld computing device to display an image in accordance with the zoom level updated in response to the rotational motion signal 130. The control logic 120 may provide a control signal 140 to control the handheld computing device.

Figure 2:
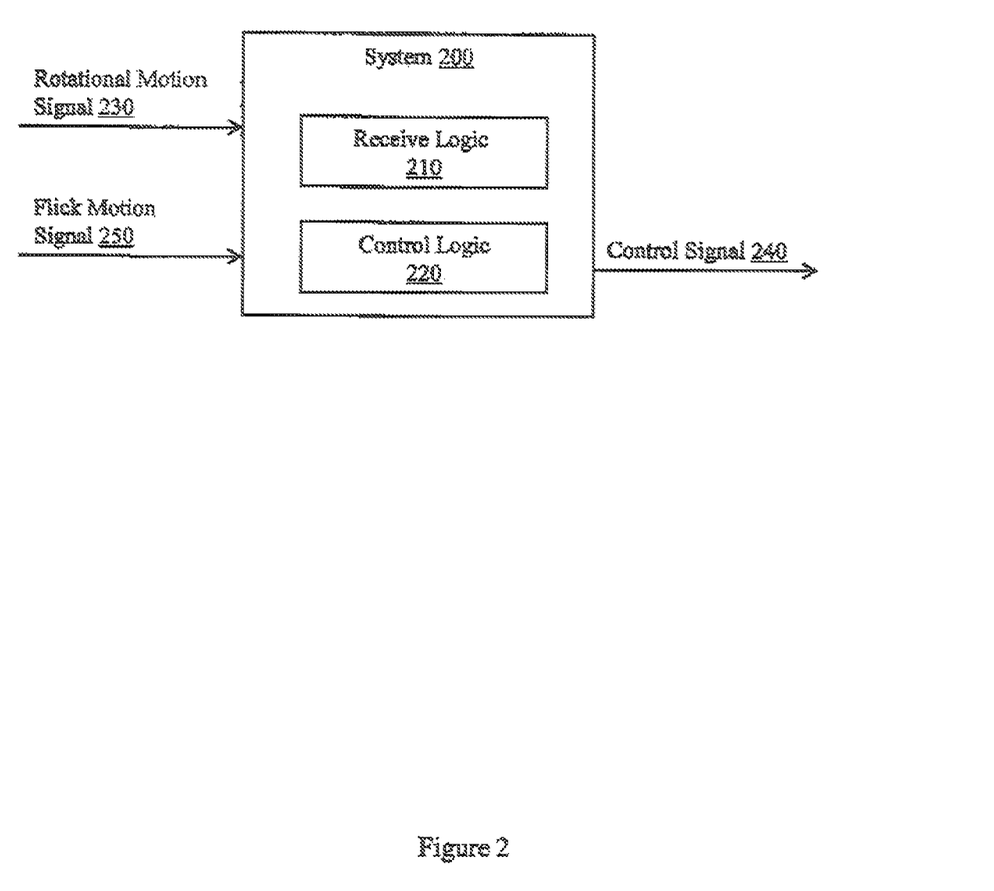
FIG. 2 illustrates another example system associated with zooming and panning using a touch wheel control on a handheld computing device.

FIG. 2 illustrates another example system associated with zooming and panning using a touch wheel control on a handheld computing device. System 200 includes elements similar to those described in connection with system 100 (FIG. 1). For example, system 200 includes a receive logic 210 to receive a rotational motion signal 230 associated with a zoom level change. Similarly, system 200 includes a control logic 220 to update a zoom level and to control a handheld computing device to display an image in accordance with the updated zoom level. The control logic 220 may exercise this control by providing a control signal 240 to the handheld computing device. However, the elements in system 200 may perform additional actions.

For example, in system 200, the receive logic 210 may, in addition to receiving the rotational motion signal 230, receive a flick motion signal 250. A "flick motion signal" 250 is associated with a "flicking" action on the touch sensor. To produce a rotational motion, a user may rotate their finger around the outside of a touch wheel. To produce a flicking motion, a user may position their finger in the middle of the touch wheel and then move it outwards towards the edge of the touch wheel. The initial position need not necessarily be in the center of the touch wheel but may, more generally, be a location inside the outer perimeter of the touch wheel. A "flick" therefore is defined as being a motion that starts with a touch at one location inside the touch wheel, progresses through one or more touches at one or more other locations inside the touch wheel, and terminates with the touch being lifted. A flick motion may have both a direction and a speed.

When an image has been zoomed in on, less than all of the image may be displayed by the handheld computing device. A user may therefore wish to "pan" a view to different visible portions of the image. Conventionally this type of panning has been accomplished using inputs from devices like joysticks, arrow buttons, knobs, and so on. Once again these devices may have been physical and/or logical. However, system 200 facilitates interpreting flick motion signal 250 to achieve panning. Flick motion signal 250 may have a flick direction component. Receive logic 210 may interpret this flick direction component to indicate a desired relocation direction of a view window associated with the image. In this example, the control logic 220 is to control the handheld computing device to relocate the view window in response to the flick motion signal. Thus, in response to a flick in a certain direction, a view window may be relocated to display a different portion of a displayed image.

The flick motion signal 250 may be interpreted in different ways based on different values for a zoom level associated with a displayed image. For example, if the image has been zoomed in on, then the flick motion signal 250 may be interpreted as a pan signal. However, in one example, if the image has not been zoomed in on, then the zoom state may be interpreted as a "scroll" state. In this example, the flick motion signal 250 may be interpreted as a scroll command to move to a different image stored on and/or available to the handheld computing device. Thus, in one example, the control logic 220 is to control the handheld computing device to selectively relocate the view window in the flick direction within the image upon determining that the zoom level is greater than a minimum zoom level. However, in another example, the control logic 220 is to control the handheld computing device to selectively relocate the view window to a second image upon determining that the zoom level is equal to the minimum zoom level.

Recall that the rotational motion signal 230 may have a velocity component. Similarly, the flick motion signal 250 may have a flick velocity component. The receive logic 210 and/or the control logic 220 may interpret this flick velocity component to indicate a desired rate of change for relocating the view window. In one example, the flick velocity component may be associated with a number of flick motion signals received within a predetermined period of time. For example, making a single flick per second may indicate a first desired pan or scroll speed while making five flicks per second may indicate a second, greater, desired pan or scroll speed.

When the flick motion signal 250 is interpreted as a scroll signal, the scrolling may be performed through an ordered set of images. The images may be stored and/or available to the handheld computing device. In this example, the control logic 220 may control the handheld computing device to selectively relocate the view window to a previous image in an ordered set of images upon determining that the flick direction was up and/or left. Conversely, the control logic 220 may control the handheld computing device to selectively relocate the view window to a subsequent image in the ordered set of images upon determining that the flick direction is down and/or right. Once again, different users may have different preferences for which flick direction(s) is to be interpreted as a previous/next signal and thus, in one example, this may be a configurable process.

Figure 3:
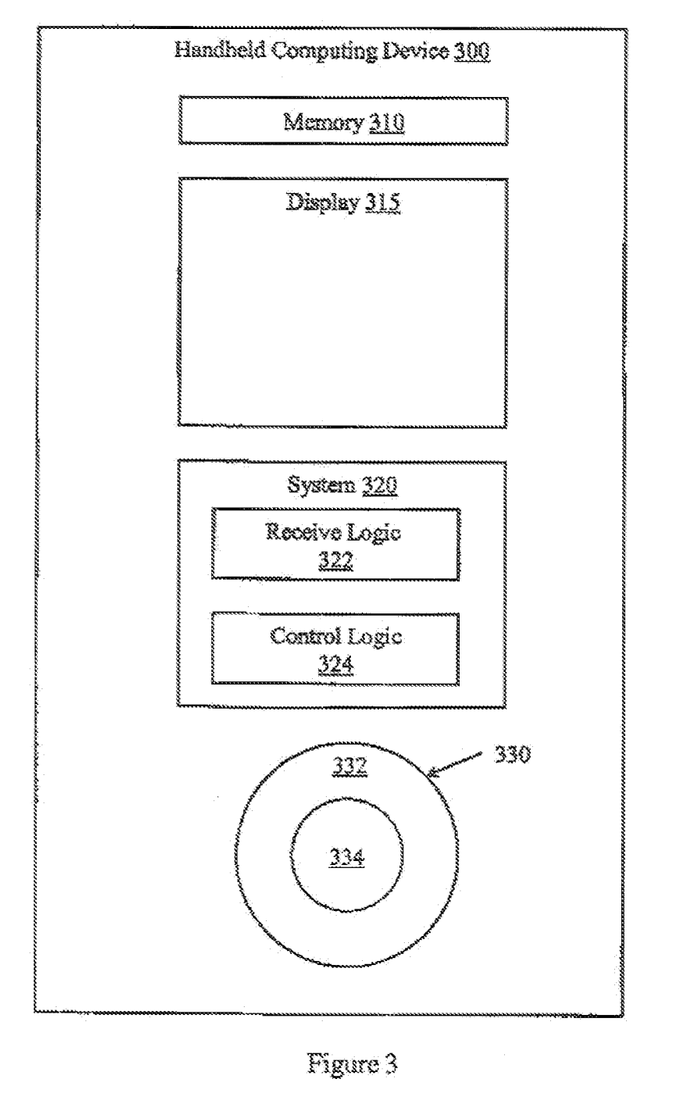
FIG. 3 illustrates another example system associated with zooming and panning using a touch wheel control on a handheld computing device.

FIG. 3 illustrates another example system associated with zooming and panning using a touch wheel control on a handheld computing device. While system 100 (FIG. 1) and system 200 (FIG. 2) were illustrated with just their elements, system 320 is illustrated inside a handheld computing device 300.

Handheld computing device 300 may be, for example, a PDA, a cellular telephone, a GPS device, a combination of these types of devices, and so on. Handheld computing device 300 includes a memory 310. Memory 310 may store a digital image and a parameter(s) associated with the digital image. The parameter may be, for example, a zoom level, a view window size, a view window location, and so on. Device 300 may also include a display 315 on which a digital image may be displayed. The image may be displayed to comport with the parameters (e.g., zoom level, view window location).

Device 300 includes a touch sensor 330. Touch sensor 330 is illustrated as being circular and as having an outer closed loop portion 332 to detect a rotational motion interaction. Touch sensor 330 is also illustrated as having an inner pad portion 334 to detect a flick motion interaction. While a circular touch sensor 330 is illustrated, it is to be appreciated that touch sensor 330, and other touch sensors referred to herein, may have other shapes including, but not limited to, an oval shape, a rectangular shape, a diamond shape, an oblong shape, and so on.

Device 300 includes a system 320 that includes a receive logic 322. Receive logic 322 is configured to receive a rotational motion signal from the touch sensor 330 and to receive a flick motion signal from the touch sensor 330. The rotational motion signal may be generated by outer portion 332 while the flick motion signal may be generated by inner portion 334. System 320 also includes a control logic 324 to control the presentation of the image on the display 315. The control logic 324 is to control the presentation in response to the rotational motion signal and/or the flick motion signal.

The rotational motion signal may have a rotational direction that indicates a desired change in a zoom level of the presentation. Therefore, in one example, the control logic 324 is to selectively increase the zoom level of the presentation in response to a clockwise rotational direction and to selectively decrease the zoom level of the presentation in response to a counter-clockwise rotational direction. Similarly, the flick motion signal may have a flick direction that indicates a desired relocation of a view window associated with the presentation. Therefore in one example, the control logic 324 is to control the presentation of the image on display 315 in response to the flick motion signal by selectively relocating the view window in the flick direction within the image.

Figure 4:
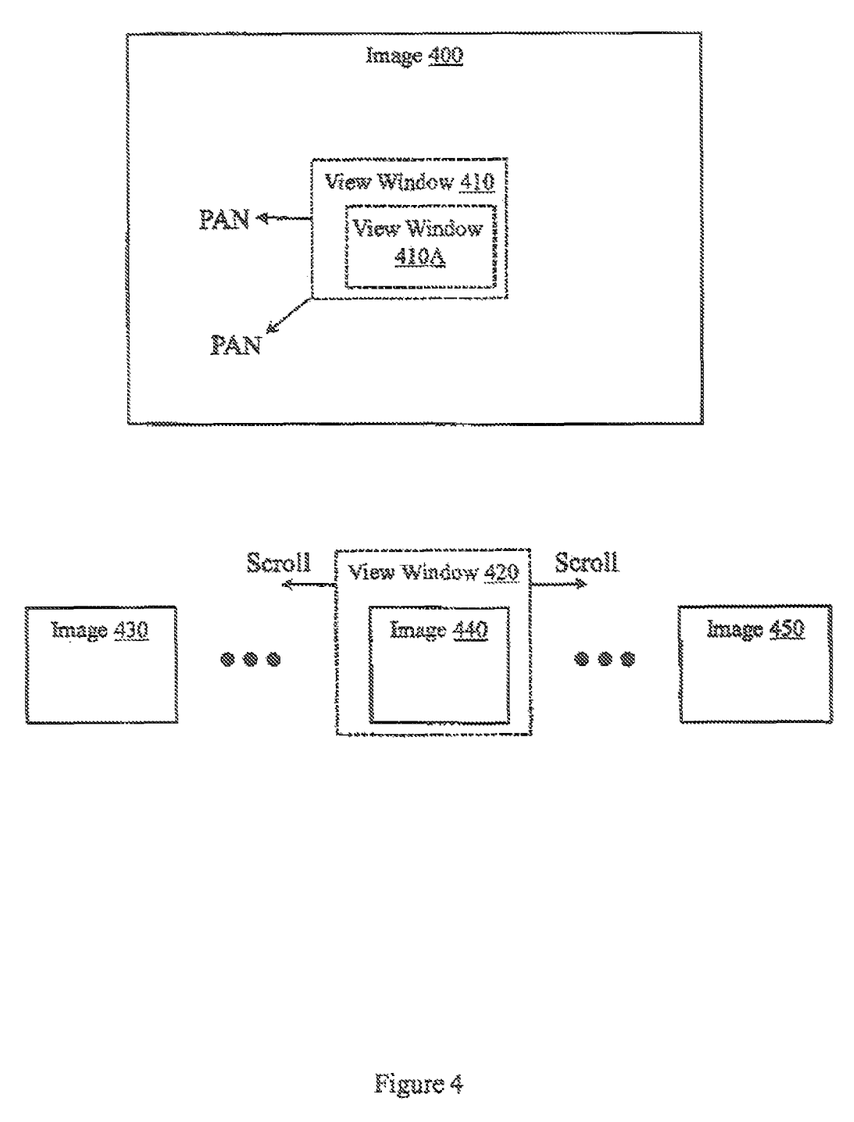
FIG. 4 illustrates an example view window associated with zooming and panning using a touch wheel control on a handheld computing device.

FIG. 4 illustrates an image 400. Image 400 may be displayed on, for example, a handheld computing device like those described above in connection with system 100 (FIG. 1), system 200 (FIG. 2), and system 320 (FIG. 3). Therefore a user may have "zoomed in" on a portion of image 400. The zoomed in portion may be visible in a view window 410. If the user zooms in even further, then a smaller portion of image 400 may be visible in view window 410A. One skilled in the art will be familiar with the traditional concepts of zooming in and out and resizing a view window. One skilled in the art will also be familiar with the traditional concept of relocating view window 410 to pan to a different portion of image 400. However, one skilled in the art will recognize that the zoom and pan actions illustrated for image 400 have typically not been controlled using a touch wheel form of a touch sensor.

FIG. 4 also illustrates an ordered set of images that includes a first image 430, a last image 450, and an image 440 located somewhere in the ordered set between the first image 430 and the last image 450. Image 440 may be displayed on a handheld computing device like those described above in connection with system 100 (FIG. 1), system 200 (FIG. 2), and system 320 (FIG. 3). If a user has not "zoomed in" on image 440, then a pan signal may be interpreted as a scroll signal by example systems and methods. The scroll signal may cause a view window 420 to be repositioned in the ordered set of images. For example, a flick left may reposition the view window 420 more towards the first image 430 while a flick right may reposition the view window 420 more towards the last image 450.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
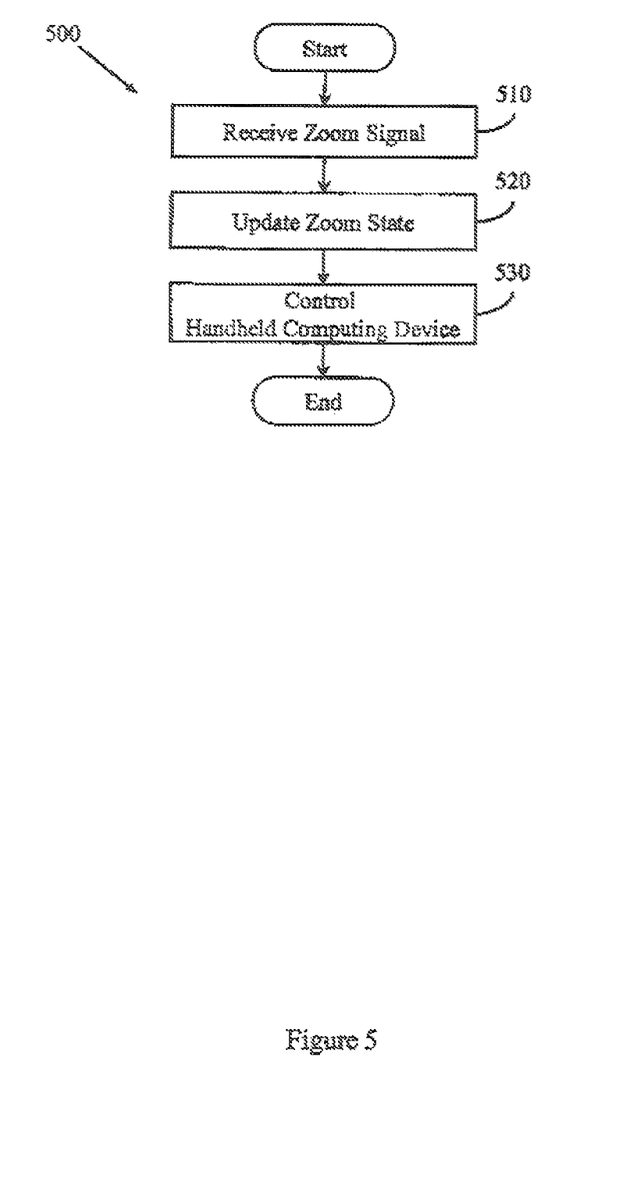
FIG. 5 illustrates an example method associated with zooming using a touch wheel control on a handheld computing device.

FIG. 5 illustrates an example method 500 associated with zooming an image displayed on a handheld computing device using a touch wheel touch sensor control on the handheld computing device. Method 500 includes, at 510, receiving a zoom signal. The zoom signal may be received from a first portion of a touch sensor arranged on the handheld computing device. The first portion of the touch sensor may be an outer loop disposed around an inner portion. The zoom signal may be generated in response to a rotational touch motion occurring around at least a portion of the outer loop. A "zoom signal" refers to a signal associated with indicating a desire to affect a zoom level associated with an image being displayed on the handheld computing device.

Method 500 includes, at 520, selectively updating a zoom state associated with an image displayed on the handheld computing device. The zoom state is selectively updated because a zoom signal may indicate, for example, a desire to increase a zoom level when the zoom level is already at a maximum amount or a desire to decrease a zoom level when the zoom level is already at a minimum amount. The zoom state may be stored, for example, as a value in a data store, as a value in a register, as a message in a message store, and so on.

Method 500 may also include, at 530, controlling the handheld computing device to update the image displayed on the handheld computing device to comport with the zoom state updated at 520. Thus, method 500 includes receiving a rotational signal from a touch sensor, selectively updating a zoom state based on the rotational signal, and then controlling the handheld computing device to display the image in accordance with the updated zoom state.

In one example, the zoom signal may include both a rotational direction component and a rotational velocity component. Since the control from which the rotational signal is received may be oriented as a circle, an oval, a loop, and so on, the rotational direction may be a clockwise direction or a counter-clockwise direction. Therefore, selectively updating the zoom state at 520 may include increasing the zoom state in response to the zoom signal having a first rotational direction component and decreasing the zoom state in response to the zoom signal having a second rotational direction where the first rotational direction is opposite to the second rotational direction. For example, a clockwise signal may indicate a desire to increase the zoom level while a counter-clockwise signal may indicate a desire to decrease the zoom level. As described above, the zoom signal may also include a rotational velocity component. This component may be related to, for example, how quickly a user moved their finger around the control generating signal. Since a velocity component may be available, selectively updating the zoom state at 520 may include changing the zoom state at a rate determined by the rotational velocity component.

While FIG. 5 illustrates various actions occurring in serial, it is to be appreciated that various actions illustrated in FIG. 5 could occur substantially in parallel. By way of illustration, a first process could receive zoom signals, a second process could selectively update zoom states, and a third process could control a handheld computing device to display an image in accordance with an updated zoom state. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 500. While executable instructions associated with method 500 are described as being stored on a computer-readable medium, it is to be appreciated that executable instructions associated with other example methods described herein may also be stored on a computer-readable medium.

Figure 6:
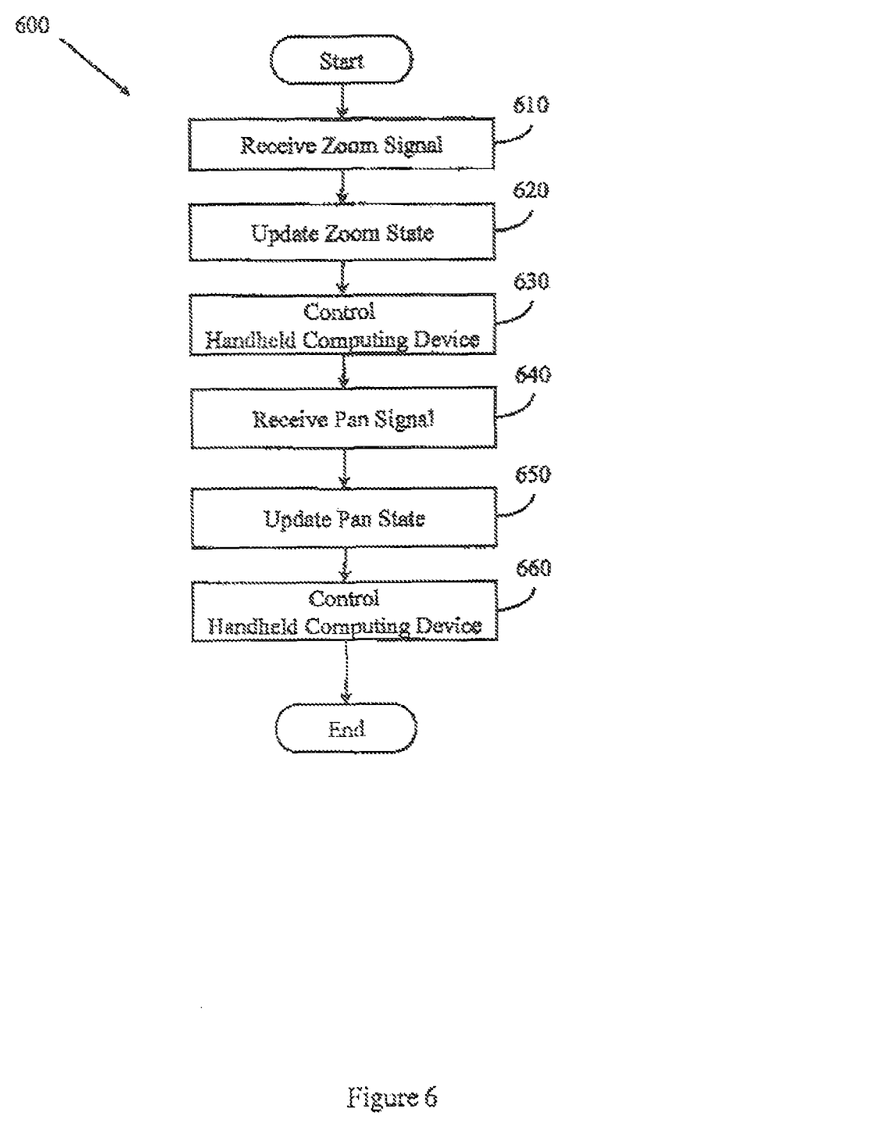
FIG. 6 illustrates another example method associated with zooming and panning using a touch wheel control on a handheld computing device.

FIG. 6 illustrates a method 600 associated with zooming and panning using a touch wheel control on a handheld computing device. Method 600 includes some actions similar to those described in connection with method 500 (FIG. 5). For example, method 600 includes receiving a zoom signal at 610, updating a zoom state at 620, and controlling a handheld computing device at 630. However, method 600 includes additional actions.

For example, method 600 includes, at 640, receiving a pan signal from the inner portion of the touch sensor. A pan signal is defined as a signal intended to indicate a desired direction for a pan action. In one example, the pan signal may be generated in response to a set of touches that produce a directional touch motion. In different examples, the series of touches may be made in the inner portion of the touch sensor, may be made on the outer portion of the touch sensor, may include a combination of touches on the inner and outer portion, and so on. In another example, the directional touch may be generated by "flicking" the touch sensor in a certain direction. The directional touch motion may indicate a direction in which a user wants to pan a viewing window associated with a displayed image. Recall that when an image has been zoomed in on that less than the entire image may be presented on a display. Therefore a user may wish to relocate the image to change which portion of the image is currently being viewed. This direction may be indicated using the touch sensor.

Therefore, method 600 may include, at 650, updating a pan state associated with the image. The pan state may be selectively updated at 650 because a user may indicate a desire to pan in a direction when the image is already panned as far in that direction as it can be panned. The pan state may be updated at 650 in response to receiving the pan signal.

Method 600 may also include, at 660, controlling the handheld computing device to update the image displayed on the handheld computing device to comply with the pan state. Controlling the handheld computing device may include, for example, sending a signal to the handheld computing device, invoking a method available in a process on the handheld computing device, making a call to a process available on the handheld computing device, providing a current and/or voltage to a circuit on the handheld computing device, generating an interrupt on the handheld computing device, and so on.

Recall that the rotational signal may have included both a direction and velocity component. The pan signal may similarly include a pan direction component and a pan velocity component. Therefore, selectively updating the pan state at 650 may include changing a center display point of the image in the direction of the pan direction component at a rate determined by the pan velocity component.

Figure 7:
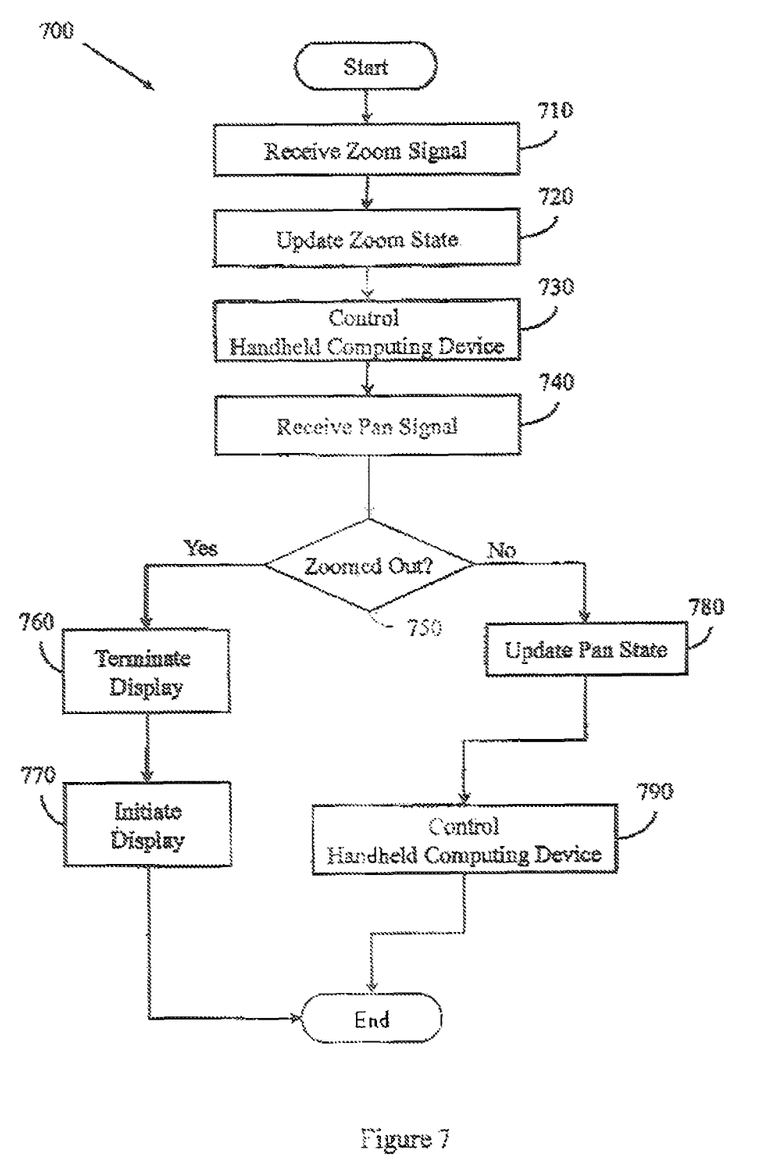
FIG. 7 illustrates another example method associated with zooming and panning using a touch wheel control on a handheld computing device.

FIG. 7 illustrates a method 700 associated with zooming and panning using a touch wheel control on a handheld computing device. Method 700 includes some actions similar to those described in connection with method 600 (FIG. 6). For example, method 700 includes receiving a zoom signal at 710, updating a zoom state at 720, and controlling a handheld computing device at 730 to comport with the updated zoom state. Additionally, method 700 includes receiving a pan signal at 740, updating a pan state at 780, and controlling the handheld device at 790 to comport with the updated pan state. However, method 700 includes additional actions.

For example, method 700 includes discriminating between a pan signal and a scroll signal. By way of illustration, after a pan signal is received at 740, a decision may be made, at 750, concerning whether an image is completely zoomed out. If so; then the pan signal is to be interpreted as a scroll signal. If not, then the pan signal is to be interpreted as a pan signal.

Thus, upon determining at 750 that the zoom state indicates a scroll state, method 700 may proceed, at 760, by terminating the display of a currently displayed image on the handheld computing device and then, at 770, by initiating the display of a new image on the handheld computing device. Terminating 760 the display of a currently displayed image may include, for example, removing an image from memory, updating a pointer to a video memory location, and so on. Similarly, initiating 770 the display of the new image may include writing a image to memory, updating a pointer to a video memory location, and so on.

Figure 8:
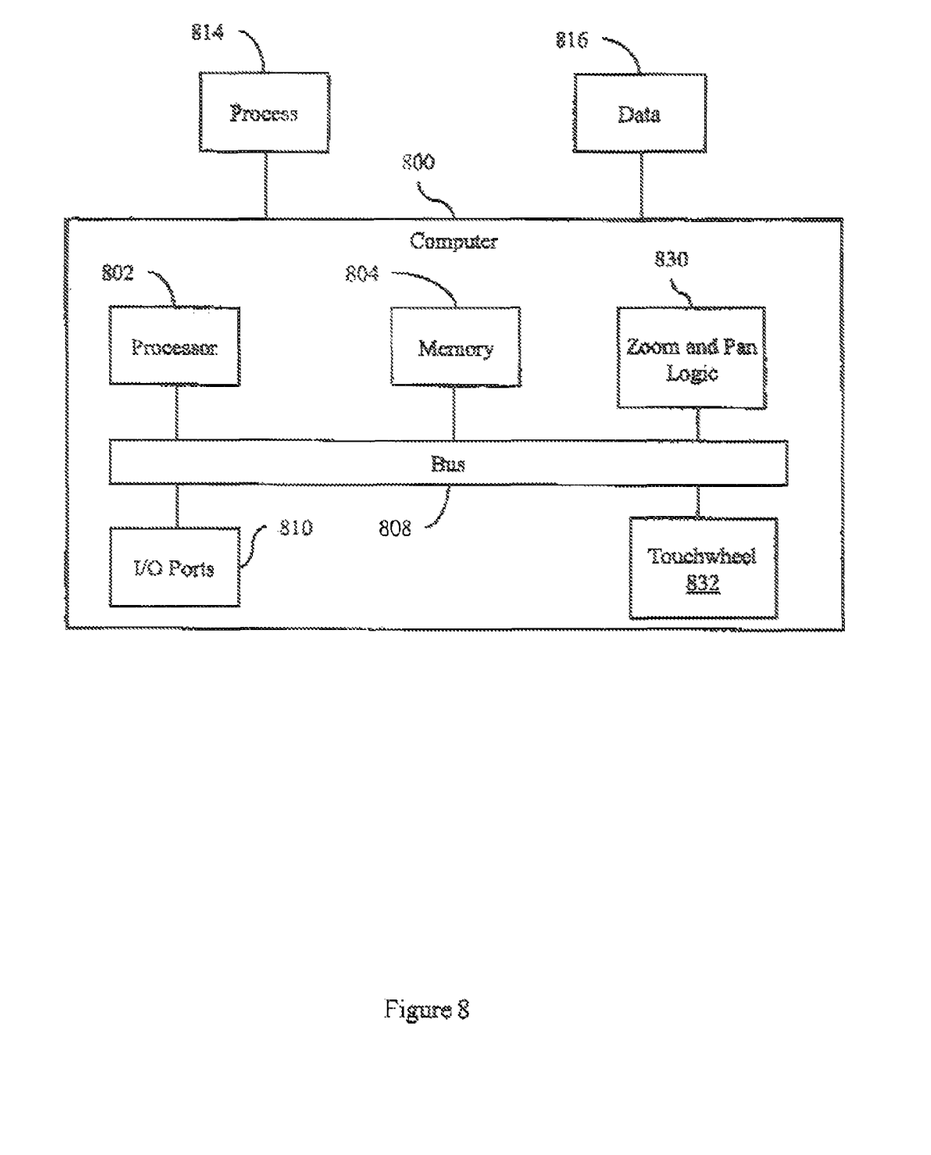
FIG. 8 illustrates an example computing environment in which example systems and methods, and equivalents, may operate.

FIG. 8 illustrates an example computing device in which example systems and methods described herein, and equivalents, may operate. The example computing device may be a handheld computer 800 that includes a processor 802, a memory 804, and input/output ports 810 operably connected by a bus 808. In one example, the computer 800 may include a zoom and pan logic 830 configured to facilitate receiving and processing signals from a touch wheel 832. As described above, touch wheel 832 may be a touch sensor having an outer region arranged in a loop configuration and an inner portion. The outer region may be used to generate rotational signals associated with zooming while the inner region may be used to generate flick signals associated with panning and/or scrolling. The outer region may be configured as a loop having a physical constraint formed on an upper surface of the touch wheel and co-extensive with the loop and an inner portion arranged inside the loop.

In different examples, the logic 830 may be implemented in hardware, software, firmware, and/or combinations thereof.

While the logic 830 is illustrated as a hardware component attached to the bus 808, it is to be appreciated that in one example, the logic 830 could be implemented in the processor 802.

Logic 830 may provide means (e.g., hardware, software, firmware) for receiving a rotational zoom signal from the touch wheel 832. The rotational zoom signal is generated in response to an interaction with the loop. The means may be implemented, for example, as an ASIC programmed to receive and process the signal. The means may also be implemented as computer executable instructions that are presented to computer 800 as data 816 that are temporarily stored in memory 804 and then executed by processor 802.

Logic 830 may also provide means (e.g., hardware, software, firmware) for selectively updating a zoom state associated with an image displayed on the handheld computing device 800. The updating may be based, at least in part, on the rotational zoom signal. Updating the zoom state may include, for example, controlling processor 802 to update a value in memory 804.

Logic 830 may also provide means for receiving a pan signal from the touch wheel 832. The pan signal may be generated in response to an interaction with the inner portion of the touch wheel 832. Logic 830 may also provide means for selectively updating a pan state associated with the image displayed on the handheld computing device 800. The updating may be based, at least in part, on the pan signal. Thus, the updating may include logically relocating a center point associated with a view window logically positioned over an image displayed on computer 800.

Logic 830 may also include means for controlling the handheld computing device 800 to display the image in accordance with the zoom state and the pan state. Controlling the handheld computing device 800 may include, for example, providing data and instructions to processor 802 to change an image portion stored in memory 804.

Generally describing an example configuration of the computer 800, the processor 802 may be a variety of various processors including dual microprocessor and other multiprocessor architectures. A memory 804 may include volatile memory and/or non-volatile memory. Non-volatile memory may include, for example, ROM, PROM, and so on. Volatile memory may include, for example, RAM, SRAM, DRAM, and so on. The memory 804 can store a process 814 and/or a data 816, for example. The memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus. The computer 800 may interact with input/output devices via the input/output ports 810.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computing device comprising:
   a touch sensor;
   one or more processing resources; and
   one or more memory resources storing a set of images and instructions that when executed by the one or more processing resources, cause the computing device to:
   receive a rotational input on the touch sensor corresponding to a change in a zoom level of a displayed image from the set of images;
   receive a flick input on the touch sensor, the flick input including flick direction;
   in response to receiving the rotational input, change the zoom level of the displayed image;
   in response to receiving the flick input, determine whether the zoom level is greater than a minimum zoom level;
   in response to determining that the zoom level is greater than the minimum zoom level, pan the displayed image according to the flick direction; and
   in response to determining that the zoom level is not greater than the minimum zoom level, scroll to a second image from the set of images.

2. The computing device of claim 1, wherein the touch sensor is circular in shape comprising a closed loop defined by an outer ring and an inner ring, and wherein the rotational input is received on a surface of the closed loop in between the outer ring and the inner ring.

3. The computing device of claim 2, wherein the flick input is received on the surface of the closed loop in between the outer ring and the inner ring of the touch sensor.

4. The system computing device of claim 1, wherein the executed instructions cause the computing device to selectively increase the zoom level in response to a clockwise rotational input and selectively decrease the zoom level in response to a counterclockwise rotational input.

5. The computing device of claim 1, wherein the executed instructions further cause the computing device to:
   determine an angular velocity of the rotational input;
   wherein the executed instructions cause the computing device to change the zoom level of the displayed image at a rate based on the angular velocity.

6. The computing device of claim 2, wherein the flick input is received on a surface encompassed by the inner ring of the touch sensor.

7. The computing device of claim 1, wherein the executed instructions further cause the computing device to:
 determine a flick velocity of the flick input;
 wherein, when the zoom level is greater than the minimum zoom level, the executed instructions cause the computing device to scroll the image at a rate based on the flick velocity.

8. The computing device of claim 7, wherein the flick velocity is associated with a number of flick motion signals received by the touch sensor within a predetermined period of time.

9. The computing device of claim 7, wherein the executed instructions further cause the computing device to:
 when the zoom level is not greater than the minimum zoom level, determine whether the flick direction is in a first predetermined direction or a second predetermined direction;
 in response to determining that the flick direction is in the first predetermined direction, scroll to a previous image from the set of images; and
 in response to determining that the flick direction is in the second predetermined direction, scroll to a subsequent image from the set of images.

10. The computing device of claim 1, wherein the touch sensor is at least one of a resistive touch sensor, a capacitive touch sensor, an inductive touch sensor, a surface acoustic wave sensing touch sensor, a pressure sensing touch sensor, an optical sensing touch sensor, or an electro-mechanical touch sensor.

11. The computing device of claim 1, wherein the touch sensor is either (i) overlaid on a keypad of the computing device, (ii) integrated into a keypad of the computing device, or (iii) integrated with a touch-sensitive display of the computing device.

12. A non-transitory computer-readable medium storing instructions that, when executed by a processor of a computing device, cause the computing device to perform operations comprising:
 receiving a zoom input on a touch sensor of the computing device, the zoom input corresponding to a change in a zoom level of a displayed image from a set of images;
 in response to receiving the zoom input, changing the zoom level of the displayed image;
 receiving a directional input on the touch sensor;
 in response to receiving the directional input, determining whether the zoom level is greater than a minimum zoom level;
 in response to determining that the zoom level is greater than the minimum zoom level, panning the displayed image in a direction corresponding to the directional input; and
 in response to determining that the zoom level is not greater than the minimum zoom level, scrolling to a second image in the set of images.

13. The non-transitory computer-readable medium of claim 12, wherein the touch sensor is circular in shape comprising a closed loop, the closed loop being defined by an outer ring and an inner ring, and wherein the zoom input is received on a surface of the closed loop, and wherein the directional input is received on an area within the inner ring.

14. The non-transitory computer-readable medium of claim 12, wherein the zoom input is a rotational input, and wherein the instructions, when executed by the processor, cause the computing device to perform further operations comprising:
 determining an angular velocity of the rotational input;
 wherein the executed instructions cause the computing device to change the zoom state level at a rate based on the angular velocity.

15. The non-transitory computer-readable medium of claim 14, wherein the instructions, when executed by the processor, cause the computing device to perform further operations comprising:
 determining a directional velocity of the directional input;
 wherein, when the zoom level is greater than the minimum zoom level, the executed instructions cause the computing device to scroll the displayed image at a rate based on the directional velocity.

16. A computer-implemented method for controlling zooming and panning of a displayed image, from a set of images, on computing device, the method being performed by one or more processors of the computing device and comprising:
 receiving a zoom input on a touch sensor of the computing device, the zoom input corresponding to a change in a zoom level of the displayed image;
 in response to receiving the zoom input, changing the zoom level of the displayed image;
 receiving a directional input on the touch sensor;
 in response to receiving the directional input, determining whether the zoom level is greater than a minimum zoom level;
 in response to determining that the zoom level is greater than the minimum zoom level, panning the displayed image in a direction corresponding to the directional input; and
 in response to determining that the zoom level is not greater than the minimum zoom level, scrolling to a second image in the set of images.

17. The method of claim 16, wherein the touch sensor is circular in shape comprising a closed loop, the closed loop being defined by an outer ring and an inner ring, and wherein the zoom input is received on a surface of the closed loop, and wherein the directional input is received on an area within the inner ring.

18. The method of claim 16, further comprising:
 determining an angular velocity of the zoom input, the zoom input being a rotational input;
 wherein the one or more processors are to change the zoom level at a rate based on the angular velocity.

19. The method of claim 16, further comprising:
 determining a directional velocity of the directional input;
 wherein, when the zoom level is greater than the minimum zoom level, the one or more processors are to scroll the displayed image at a rate based on the directional velocity.

* * * * *